United States Patent Office 3,279,588
Patented Oct. 18, 1966

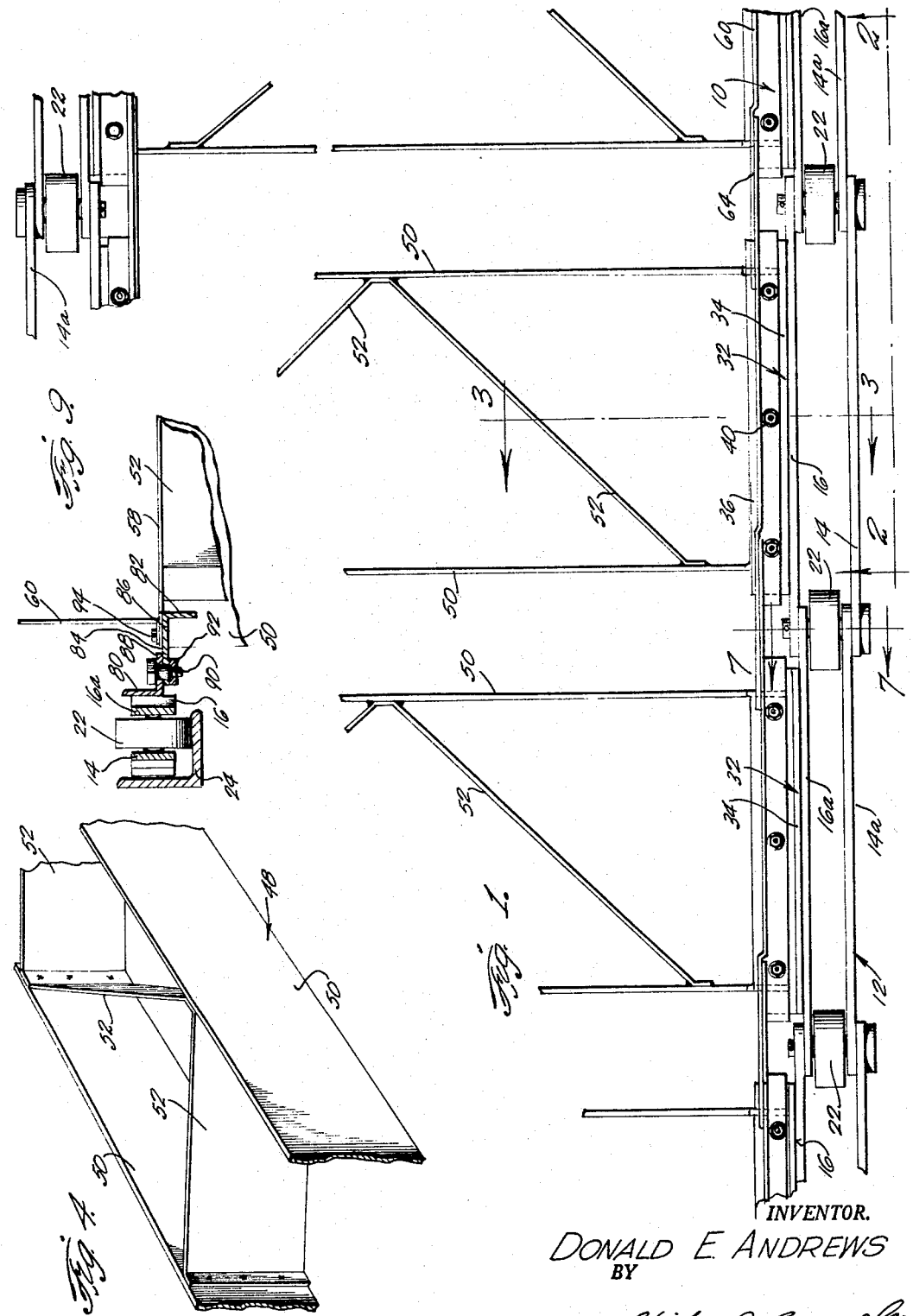

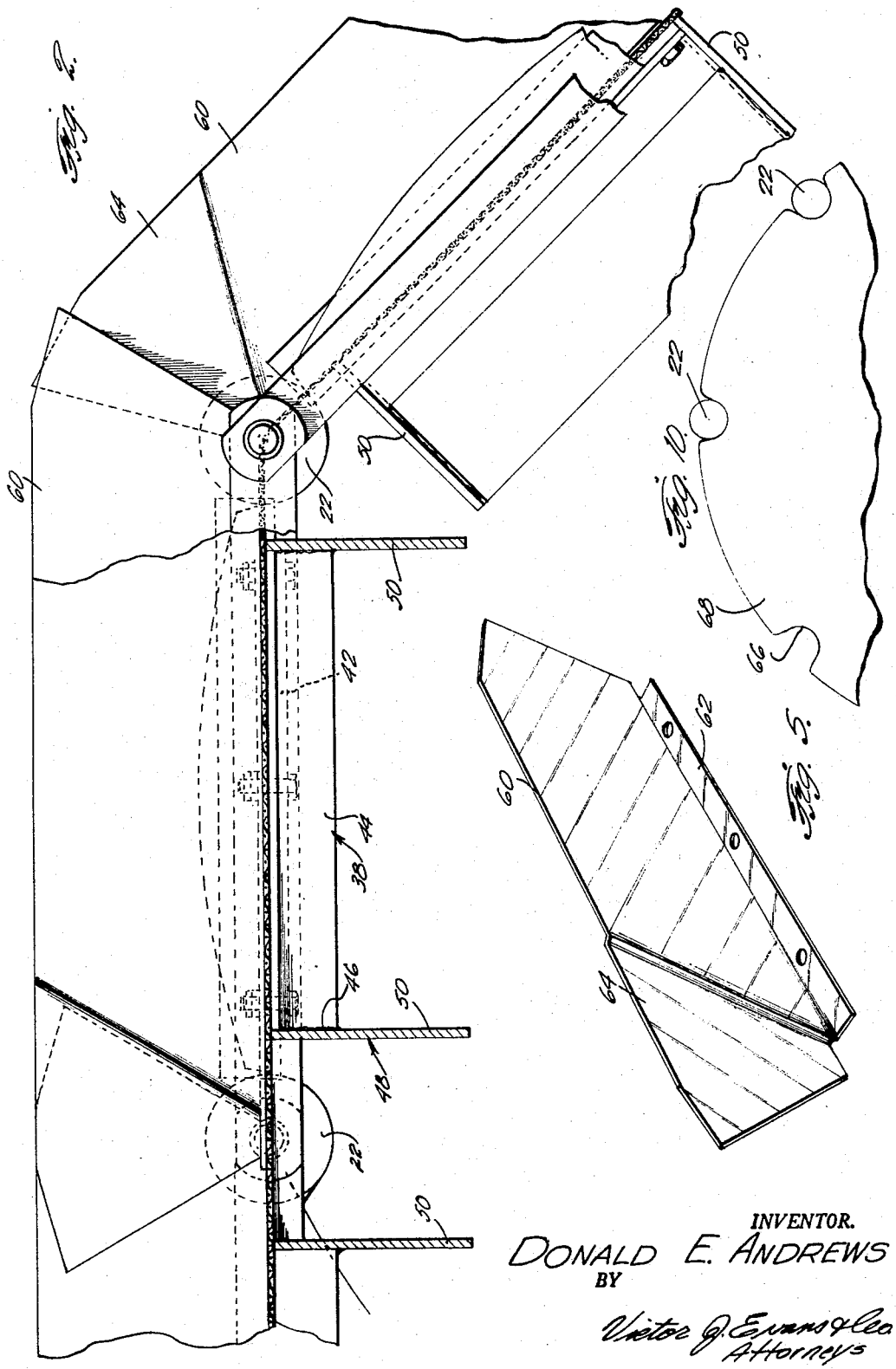

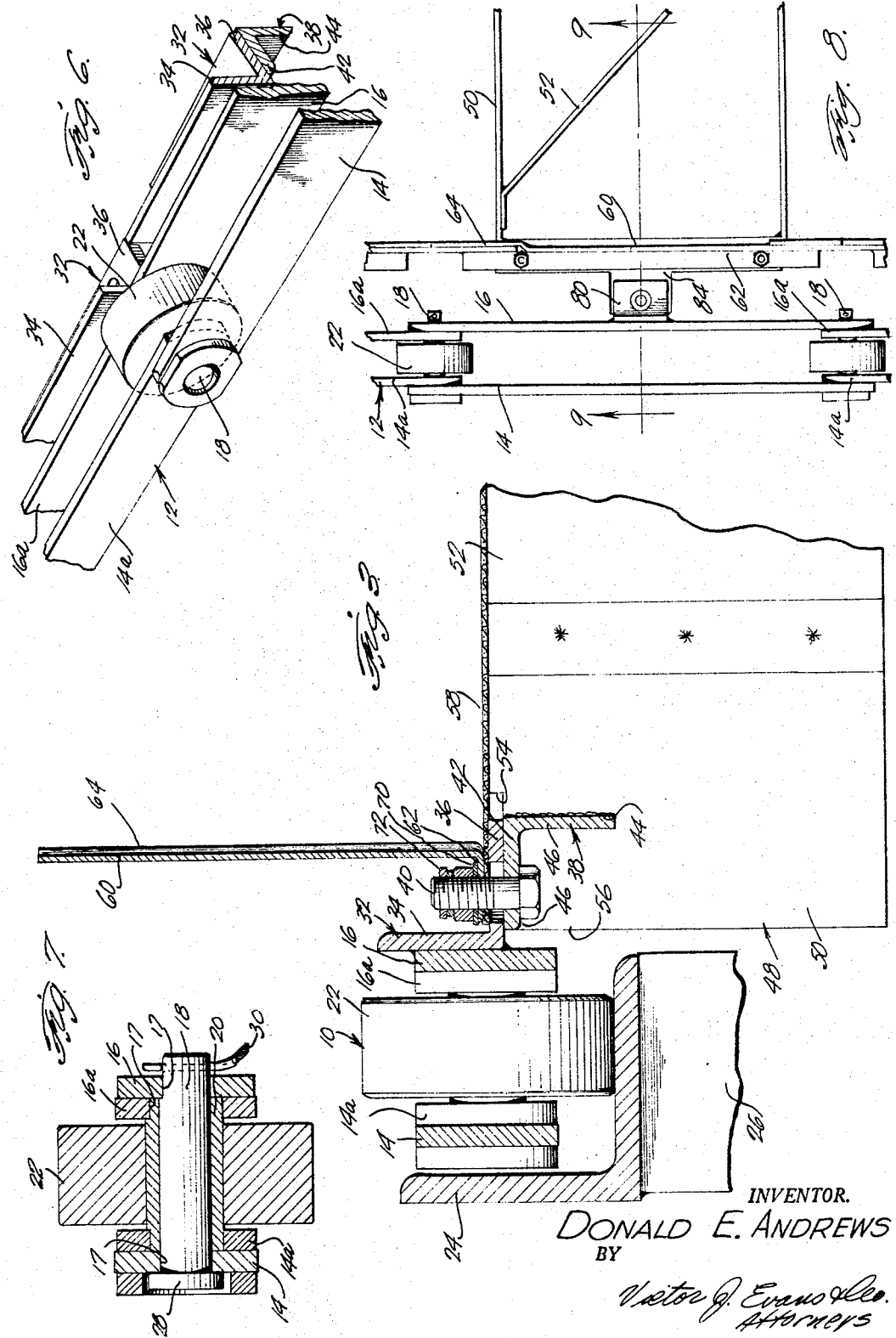

3,279,588
CONVEYOR
Donald E. Andrews, Cambridge, Md., assignor to Cambridge Wire Cloth Company, Cambridge, Md., a corporation of Maryland
Filed Dec. 6, 1963, Ser. No. 328,719
4 Claims. (Cl. 198—194)

The present invention relates to a conveyor, and more particularly to what is generally known as an apron conveyor such as is used to convey material while subjecting it to a treatment in drying or conditioning machines, and wherein mesh or wire cloth sections are supported between corresponding link members of a pair of spaced side chains carried by guide sprocket members.

In most of the known types of apron conveyors, the open mesh or wire cloth belt has been supported by rods, tubes, flat members, T's, channels, and what is known as junior I-beams. All of these structures have had a serious disadvantage in that they have a relatively low strength to weight ratio. While this is not particularly critical on relatively narrow belts, such as a one-foot wide conveyor belt, it becomes increasingly critical as the width of the belt is increased. For example, in widths on the order of four feet to fifteen feet, the belt support structure must have a high strength-to-weight ratio in order to carry the weight of the support plus the weight of the load being transported without excessive deflection and stress.

In addition, the belt support structure must be constructed in such a way as not to impede the circulation of air or any other media through the open mesh of the belt surface. Some of the standard constructions for supporting the belt are relatively strong but cannot be used from a practical standpoint because they do not allow free circulation of air or other media through the belt.

The belt support must also be manufactured or fabricated in an economical manner, and so that it allows fabrication of the entire belt structure at a reasonable cost. Some of the standard means of construction can be oversized sufficiently to carry heavy loads on wide belts. However, when this is done, the weight and price of the support member become excessive. In addition, the additional weight demands the use of a heavier and more expensive chain.

It is an object of the present invention to provide a belt support structure which eliminates the disadvantages mentioned heretofore, and which structure has a very high strength-to-weight ratio, and which allows free circulation of air or other media through the mesh of the belt surface, and which structure can be fabricated at a relatively low cost, and permits fabrication of the belt at a minimum cost.

It is another object of the present invention to provide a truss-type belt support structure for supporting an open mesh belt member thereon which is highly resistant to deflection and stress and which will have a high strength-to-weight ratio in order to carry the weight of the support plus the weight of the load being transported thereon.

It is another object of the present invention to provide a conveyor structure comprising a truss-type support which connects two flat members together, which two flat members, in turn, are connected to link chains carried by driven sprocket wheels or members.

It is another object of the present invention to provide an open mesh belt support structure consisting of a truss extending transversely between two link chains and connected thereto by two flat members, in which the depth of the truss is substantially greater than its thickness so that the flat members are structurally reinforced and will not fail by buckling and the like.

Various other objects and advantages of the present invention will be readily apparent from the following detailed description when considered in connection with the accompanying drawings forming a part thereof, and in which FIGURE 1 is a fragmentary top plan view of the belt support structure embodied in the present invention;

FIGURE 2 is a section taken along the line 2—2 of FIGURE 1 on an enlarged scale;

FIGURE 3 is an enlarged section taken along the line 3—3 of FIGURE 1;

FIGURE 4 is a fragmentary detail view of the truss embodied in the present invention;

FIGURE 5 is a perspective detailed view of an upstanding member disposed adjacent the side of the conveyor to prevent edge spill of material carried on the conveyor;

FIGURE 6 is a fragmentary perspective detail view of the means of connecting two link chains to each other;

FIGURE 7 is an enlarged view taken along the line 7—7 of FIGURE 1;

FIGURE 8 is a fragmentary top plan view of a modification of the invention shown in FIGURE 1;

FIGURE 9 is a fragmentary section taken along the line 9—9 of FIGURE 8; and

FIGURE 10 shows the sprocket drive for the conveyor.

Referring to the drawings, the reference numeral 10 generally designates an apron conveyor provided with laterally spaced link chains 12, only one of which is shown, the other link chain being a mirror image of the link chain 12. The chains are made up of a plurality of link members 14 and 16, and 14a and 16a, as best seen in FIGURES 3, 6 and 7. All of the link members 14, 14a, 16 and 16a are identical in structure and extend in a lateral direction with apertures or openings 17 in the opposite ends thereof for pivotally connecting them to a pivot pin 18, as seen in FIGURE 7. The link members 14 and 14a are disposed adjacent the outer side of the conveyor, while the link members 16 and 16a are disposed adjacent the inner side of the conveyor. The link members 14a and 16a alternate with the links 14 and 16, and the links 14a and 16a are disposed on the pins 18 inwardly of the links 14 and 16. The link members and the pins are arranged so as to form an endless chain. It will also be noted that the ends of the links 14a and 16a overlap the adjacent ends of the links 14 and 16. Each pivot pin 18 can be provided with a sleeve bushing 20 on which is mounted a roller 22. The rollers 22 are adapted to travel along horizontal angular guide rails 24 supported on frame members 26. The pivot pins 18 are provided with a head 28 and a cotter pin 30 for properly securing the component parts of the chain thereto for rotative movement about the pin and pivotal movement thereabout.

Each of the inner link members 16 and 16a is provided with a horizontal angular member 32 welded thereto, as best seen in FIGURES 3 and 6. The angular member 32 has a vertical upwardly extending leg 34 and a horizontal leg 36 extending inwardly from the bottom of leg 34. Members 32 are welded to the link members 16 and 16a so that the upper portion of the vertical leg 34 extends above the top of link members 16 and 16a. Members 32 are substantially shorter in length than the link members 16 and 16a, as shown in FIGURES 1 and 6.

Another horizontal angular member 38 is connected to the upper horizontal angular member 32 by a plurality of bolt members 40 extending through complementary apertures or openings in the members 32 and 38. The members 38 have an upper horizontally extending leg 42 and a vertical leg 44 extending downwardly from the inner end of the upper leg 42, as best seen in FIGURES 3 and 6. Horizontal angular member 38 is approximately of the same length as the upper angular member 32 and is substantially shorter than the link members 16 and 16a. Members 38 have their opposite longitudinal ends of their vertical legs 44 and the opposite ends of their horizontal legs 42 welded as indicated at 46 to a truss belt support structure generally indicated as 48.

Truss structure 48 is provided with two vertical transverse members 50 spaced apart in the longitudinal direction of the longitudinal axis of the conveyor. The transverse members 50 are connected to each other by a plurality of vertical brace members 52 disposed therebetween and connected to the inner or facing sides of the transverse members 50 by welds or bolts. The brace members 52 are diagonally disposed with respect to the plane of the transverse members 50 and so that two adjacent brace members 52 form a V configuration between the transverse members 50. The transverse members 50 are positioned longitudinally of the conveyor, as best shown in FIGURE 2, so that the transverse members 50 carried by adjacent angular members 39 do not interfere with one another when the conveyor is in operation and passes over or by a sprocket member that drives the rollers 22.

The transverse members 50 are provided with cut-outs or slots 54, as best shown in FIGURE 3, and the angular members 38 are welded to the transverse members 50 so that their upper horizontal legs 42 are welded adjacent the lower edges of the slots 54, and with the outer edge of the leg 42 disposed adjacent the outer edge 56 of the transverse member 50. The depth of the slots 54 is approximately equal to the depth of the horizontal leg 36 of the upper angular member 32. This permits the leg 36 to extend through the slot 54 if desired, and still have its top flush with the upper edge of the transverse member 50, as best shown in FIGURE 3, so that the wire cloth 58 carried by the truss support will have a flat and even surface when it is properly secured to the belt support structure.

The conveyor is provided with vertical elongated side members 60 having an outwardly extending flange 62 provided with bolt holes for securing side members 60 to the bolts 40, as shown in FIGURE 3. The side members 60 prevent any material being carried on the wire cloth 58 from spilling off the sides of the conveyor. The members 60 are provided with a laterally inwardly offset portion 64 adjacent one end thereof with the offset portion 62 overlapping the adjacent edge of the successive side member 60 so that the opposite sides of the conveyor for the full length thereof are completely covered at all times so that no material can inadvertently spill over the side edges of the conveyor, while the interfitting relationship of the parts will not cause two adjacent side members 60 to interfere with one another as the conveyor travels over or by a sprocket member. This is best illustrated in FIGURE 2.

The rollers 22 are adapted to be carried in roller recesses 66 provided in sprocket drive members 68 at appropriate positions along the conveyor. The sprocket members 68 are rotatably driven by any suitable well-known means such as a motor, not shown.

The woven cloth 58 can be connected to the truss structure 48 by any suitable means such as by wiring the cloth to the transverse members 50 and the diagonal brace members 52 at suitable places therealong and by providing holes in the side edges of the cloth 58, as shown in FIGURE 3, and mounting the cloth on the bolts 40 over the leg member 36 and under the flange 62 on the side members 60 so that the angular members 38 not only connect the truss to the endless chains but also the wire cloth. It will be noted that a resilient washer 70 is mounted on the bolt 40 and a lock nut 72 clamps the washer and flange 62 against the wire cloth.

In the modification of the invention shown in FIGURES 8 and 9, the structure and operation are substantially as that already described in connection with the first embodiment of the invention except that the horizontally extending angular member 80 welded to the inside of the inner link members 16 and 16a is substantially shorter than the angular member 32 and is substantially shorter than the link members 16 and 16a. The angular member 80 is disposed on the link members 16 and 16a at approximately their mid points. The lower angular member 82, similar to the lower angular member 38 already described in connection with the first embodiment of the invention, is welded between two transverse members 50 and has an outwardly extending horizontal portion or section 84 projecting outwardly beyond the upper leg 86 of member 82. The portion 84 is disposed between the opposite ends of the member 82 and in alignment with the lower leg 88 of angular member 80. Portion 84 and leg 88 are provided with complementary holes for receiving bolts 90 therethrough for joining the parts together. A nut 92 is disposed in the bolt members 90 so that the truss support member is detachably connected to the angular member 80 by the bolts. It will also be noted that there is no need for a slot in the top of the transverse members 50 in this embodiment of the invention. The woven cloth 58 is supported on the truss support structure as described before and the outer edges of the wire cloth 58 are secured through the use of bolts 94 clamping the woven wire cloth between the leg 86 of the angular member and the flange of the side members 60.

The present invention thus provides a conveyor belt support means including a truss structure having transverse members with brace members disposed therebetween whose depth is considerably greater than their thickness, which members are connected to angular members in turn connected to angular members carried by the endless chain belt, so that a very strong and yet very light belt support structure is provided.

The belt support structure also has a high strength-to-weight ratio in order to carry the weight of the support structure plus the weight of the load without any excessive deflection and stress. In addition, the belt support structure does not impede the circulation of air or any other media through the mesh of the woven cloth surface. The belt support structure also allows the fabrication of the entire belt at a minimum cost, and can be used with various conventional belts.

Inasmuch as various changes may be made in the form, location and relative arrangement of the several parts without departing from the essential characteristics of the invention, it will be understood that the invention is not to be limited except by the scope of the appended claims.

What is claimed is:

1. An apron conveyor comprising:
   a pair of laterally spaced longitudinally extending continuous chain members;
   a plurality of pairs of longitudinally extending support members, the members of each pair being transversely spaced and substantially parallel to the chain members and including means for securing each support member to a chain member, each pair of support members being longitudinally spaced from the adjacent pair of support members, and each support member having a lateral surface extending substantially coplanar with the lateral surfaces of the other support members;
   a plurality of support means, each support means extending between and secured to a pair of longitudinally extending support members, each support means having a longitudinal component for offering resistance to buckling, and the depth of each support means being considerably greater than the width of the support means so as to prevent deflection while allowing circulation of conditioning media through each support means with minimum interference, the upper edges of the support means and the lateral surface of the longitudinally extending support members being substantially coplanar; and
   a wire cloth belt secured to and lying on top of the lateral surfaces of the support members and being additionally supported by the upper edges of the support means.

2. The apron conveyor defined in claim 1 wherein each support means comprises a pair of spaced transversely extending support members secured at their transverse ends to a pair of longitudinal support members, and a V-shaped cross-brace member secured to and extending between the spaced transverse support members and holding the transverse support members in their spaced relationship, the transverse members and the cross-brace members having a depth considerably greater than the width thereof so as to prevent deflection while allowing circulation of a conditioning media therethrough with minimum interference, and the width of the transverse and cross-brace members being constant throughout their depth.

3. An apron conveyor comprising:
  a pair of laterally spaced longitudinally extending continuous chain members;
  a plurality of pairs of longitudinally extending support members, the members of each pair being transversely spaced and substantially parallel to the chain members, each support member having means defining an upwardly extending leg secured to the chain member, means defining an integral inwardly extending lateral leg, and means defining a downwardly extending leg secured to the inwardly extending lateral leg, the lateral legs of all the support members being substantially coplanar, each pair of support members being longitudinally spaced from the adjacent pair of support members;
  a plurality of pairs of spaced transversely extending support members, the members of each pair secured at each transverse end to a downwardly extending leg of a pair of longitudinally extending support members, the depth of the transverse support member being considerably greater than its width;
  cross-brace members having at least a longitudinal component secured to and extending between the transverse members of each pair and holding the pair of transverse members in their spaced relationship and the cross-brace members being positioned between each pair of longitudinally extending support members, the cross-brace members having a depth considerably greater than the width thereof so as to prevent deflection while allowing circulation of a conditioning media through the members with minimum interference, the width of the transverse and cross-brace members being constant throughout their depth; and
  a wire cloth belt secured to and lying on top of the lateral leg of the longitudinally extending support members and being additionally supported on the upper edges of the transverse support members and cross-brace members.

4. The apron conveyor defined in claim 3 wherein the cross-brace members are V-shaped, the free ends of which are attached to one transverse member and the apex of which is attached to the other transverse member of each pair.

References Cited by the Examiner
UNITED STATES PATENTS

| | | | |
|---|---|---|---|
| 164,349 | 6/1875 | Wall | 14—14 |
| 346,873 | 8/1886 | Swartz | 14—3 |
| 1,988,041 | 1/1935 | Hogg | 198—194 |
| 1,995,821 | 3/1935 | Sargent | 198—194 |
| 2,007,862 | 7/1935 | Hurxthal | 198—194 |
| 2,823,790 | 2/1958 | Sifford | 198—196 |

EVON C. BLUNK, *Primary Examiner.*

WILLIAM B. LA BORDE, SAMUEL F. COLEMAN,
*Examiners.*

E. A. SROKA, *Assistant Examiner.*